Figure 1:
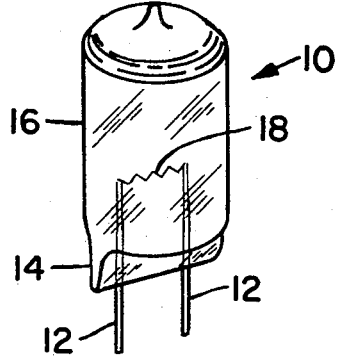

United States Patent [19]

Dumbaugh, Jr. et al.

[11] 3,723,790

[45] Mar. 27, 1973

[54] ELECTRICAL LAMP OR TUBE COMPRISING COPPER COATED NICKEL-IRON ALLOY ELECTRICAL CURRENT CONDUCTORS AND A GLASS ENCLOSURE

[75] Inventors: William H. Dumbaugh, Jr.; Joseph W. Malmendier, both of Painted Post, N.Y.

[73] Assignee: Corning Glass Works, Corning, N.Y.

[22] Filed: Feb. 1, 1971

[21] Appl. No.: 111,524

[52] U.S. Cl. ................313/221, 65/59, 106/52, 106/53, 106/54, 117/129, 313/221, 431/95
[51] Int. Cl. ..........................H01j 17/16, C03c 3/04
[58] Field of Search .117/129; 313/317, 221; 106/52, 106/53, 54; 65/59, DIG. 11, 42, 43; 313/112, 318, 218; 431/95

[56] References Cited

UNITED STATES PATENTS 2,719,932  10/1955  Stanworth ...........................106/52 X
3,496,401  2/1970  Dumbaugh ..........................313/221
3,506,385  4/1970  Weber et al. ........................106/54 X

FOREIGN PATENTS OR APPLICATIONS 1,123,857  8/1968  Great Britain.........................106/52

OTHER PUBLICATIONS

Volf, M. B.; Sealing Glasses, in Technical Glasses; London, 1961 pp. 312, 313, 324–327.

Primary Examiner—L. Dewayne Rutledge
Assistant Examiner—W. R. Satterfield
Attorney—Clarence R. Patty, Jr. and Clinton S. Janes, Jr.

[57] ABSTRACT

Electrical articles, including electrical lamps and tubes, have dumet electrical current conductors and a glass enclosure sealed to the conductors. The glass enclosure may be composed entirely of a $Na_2O$—$Li_2O$—$K_2O$—$BaO$—$Al_2O_3$—$SiO_2$ electrical sealing glass, or may be composed of a soda-lime glass envelope joined to the conductors with an intermediate component of the sealing glass.

5 Claims, 3 Drawing Figures

PATENTED MAR 27 1973

3,723,790

INVENTORS.
William H. Dumbaugh
Joseph W. Malmendier
BY

ATTORNEY

ELECTRICAL LAMP OR TUBE COMPRISING COPPER COATED NICKEL-IRON ALLOY ELECTRICAL CURRENT CONDUCTORS AND A GLASS ENCLOSURE

The invention relates to an electrical lamp or tube wherein a glass enclosure is sealed to dumet electrical current conductors. The enclosure may be composed entirely of an electrical sealing glass in accordance with the invention. Alternatively, the enclosure may consist of a conventional soda-lime-silica glass envelope and an intermediate component sealed to both the lime glass envelope and the dumet conductors. In that case, the intermediate component is formed from an electrical sealing glass in accordance with the invention.

The glass envelope for a small electrical article, such as a photoflash or instrument lamp, is customarily formed completely from an electrical sealing glass. In that case, the envelope is sealed directly to the conductors by either a pinch seal or butt seal in accordance with known procedure.

This practice is generally too expensive for larger articles such as incandescent and fluorescent lamps and certain radio tubes. Accordingly, for such articles, the envelope is produced from a relatively inexpensive $Na_2O$—$CaO$—$MgO$—$SiO_2$ glass. However, this glass does not have an adequately high electrical volume resistivity for use in the stem portion of such lamp and tube products. The stem is that portion of the lamp or tube enclosure through which the electrical current conductors pass into the interior of the lamp or tube. Accordingly, it is necessary to employ an intermediate component between the envelope glass and the metal conductors in such lamps and tubes.

This intermediate component normally includes a short length of exhaust tubing of relatively small diameter and a length of flare tubing which may be up to an inch in diameter. In producing a mount assembly for a lamp or tube, a short length of each type of tubing is mounted in conjunction with lead wires in stem making machinery. In such a machine, one end of the flare tubing is softened with a flame and the soft glass pressed or pinched around the assembly of lead wires and exhaust tube to form a lamp or tube stem. The other end of the length of flare tubing may either remain unworked, or may also be softened and flared to coincide with the opening of the particular envelope that it is to be sealed to in lamp production. Finally, the stem assembly thus formed may be provided with a filament or coil to form a mount assembly which, in turn, may be sealed to an envelope blank to produce a blank lamp or tube for further processing.

In accordance with present commercial lamp practice, a type of wire known as dumet wire is employed in the production of electrical conductors. A dumet type wire is composed of a nickel-iron alloy core portion and a copper coating or external portion. The copper coating is designed to absorb stresses that may develop during the sealing operation. There are numerous different dumet metals, depending on the particular composition of the core alloy. However, the particular member commonly employed for lamp production is a 42 percent nickel-iron alloy having a copper coating as defined in ASTM Designation F29–68.

Over the years, it has become standard practice in the electrical art to use a soft lead glass as the electrical sealing glass to seal to dumet conductor wires. Typical of such soft lead glasses are those available from Corning Glass Works under the code numbers 0010 and 0120, also sometimes referred to as G–1 and G–12. The characteristics of such glasses, and their use for lamp production, are well known and widely described in the electrical art. For example, reference may be made to U.S. Pat. No. 3,475,144 granted to R. E. Lamb on Oct. 28, 1969, to the literature cited and reviewed in the Lamb patent, and to U.S. Pat. No. 2,394,919 granted to W. E. Kingston on Feb. 12, 1946.

An electrical sealing glass must have a relatively high volume electrical resistivity to avoid current leakage through the glass between the conductors in the stem portion of the lamp. Accordingly, many product applications require a glass in which the logarithm of the resistivity is at least 10.0 as measured at 250°C., and at least 8.0 as measured at 350°C.

The glass must also have expansion characteristics, as depicted by an expansion-temperature curve, that enable it to be sealed to the conventional lime glass envelope and to the dumet metal conductors without development of undue stresses in the seals. In particular, the mismatch at the glass setting temperature, as evidenced by the separation of the respective glass and metal, or glass and glass, curves, should be less than 200 parts per million.

The commercial lead glasses have found particular favor because of their extreme resistance to devitrification during glassworking, as well as in subsequent lampworking, and because of their favorable viscosity-temperature relationship which facilitates lampworking. Resistance to devitrification requires both a low glass liquidus temperature and a slow rate of crystal formation even near that temperature. This is particularly vital in a tube drawing process known as the Vello process. A favorable lampworking characteristic is a reasonably broad working range, as indicated by the difference between softening point and strain point of the glass.

In spite of their popularity, the lead glasses have certain distinct limitations which have led to extensive efforts directed at a substitute glass. The toxic nature of lead compounds requires considerable care to minimize dusting during batch mixing. It is also necessary to minimize volatilization from glass melting units. On the economic side, lead compounds are considerably more expensive than other conventional glassmaking materials such as sand, lime, and soda. In recent years, the price of lead compounds has risen sharply, thus giving new impetus to the search for an effective substitute for lead glasses. Finally, the constant increase in operating temperatures of many types of electrical lamps and tubes makes it desirable to obtain a glass having a higher strain point. While the glass should have a strain point above 400°C., it still should have equivalent lampworking characteristics.

As early as 1913, U.S. Pat. No. 1,151,911, granted to E. C. Sullivan and W. C. Taylor, described a family of $R_2O$—$Al_2O_3$—$BaO$—$SiO_2$ glasses for lamp sealing purposes. Many years later, a related family of glasses was described in U.S. Pat. No. 2,414,505 granted to W. H. Armistead on Jan. 21, 1947. In these glasses, lead oxide was completely substituted for by barium oxide. However, the lamp industry did not accept these glasses as substitutes for the soft lead glasses. Consequently, specific efforts were directed at development of a mixed lead-barium glass as a substitute for G-12. The results of some of these efforts are described in U.S. Pat. No. 2,692,833 granted to W. H. Armistead on Oct. 26, 1954 and in U.S. Pat. No. 2,562,292 granted to H. R. Black et al. on July 31, 1951. Even these mixed barium-lead substitutes failed to win favor in the electrical art and the traditional soft lead glasses have remained in vogue despite their high cost and other limitations. Thus, there still remains the need for an effective substitute for these soft lead sealing glasses.

The primary purpose of the present invention is to supply this need by producing an effective substitute for the soft lead glasses now used in lamp and tube production in the electrical art. Another purpose is to provide a glass adapted to seal with dumet wire to form a metal-glass seal. A further purpose is to provide an inexpensive glass that can be readily drawn into tubing and worked in lamp machinery in the production of a mount assembly for an electrical lamp or tube. Another purpose is to provide a glass having electrical and sealing characteristics comparable to commercial lead glasses now in use. A specific purpose is to provide an electrical tube or lamp comprising dumet current conductors and a glass enclosure sealed thereto, the enclosure being formed in part at least of an electrical sealing glass that does not require the presence of lead oxide in the glass composition.

The electrical lamp or tube of the present invention comprises dumet electrical current conductors and a glass enclosure sealed thereto that consists in part at least of an electrical sealing glass composed in weight percent on an oxide basis of 63–71 %, $SiO_2$, 1.5–4.0 % $Al_2O_3$, 0–1.5 % $B_2O_3$, the total $Al_2O_3 + B_2O_3$ being 1.5–4.0 %, 1.5–3.0 % $Li_2O$, 1.5–3.5 % $Na_2O$, 9–12 % $K_2O$, the total alkali metal oxide content being 14–18 %, 7–17 % BaO, and 0–8 % PbO, the total BaO +PbO being 12–19%. The invention further contemplates a glass-metal seal composed of a dumet metal wire encased in a glass as defined above and the sealing glasses used in such a seal. In the tube or lamp, the enclosure may optionally includes an envelope formed from a soda-lime glass.

The invention is based on our discovery that a small family of $R_2O$—BaO—$SiO_2$ glasses has the particular combination of physical and electrical properties required for successful sealing to both dumet metal and a lime glass envelope without the development of undue strain in either seal. More particularly, it is based on our discovery that the necessary properties can be achieved in a silicate glass by adding thereto a combination of alkali metal oxides and barium oxide within narrow, interrelated limits, and by combining therewith a small, but limited, amount of $Al_2O_3$. Optionally, small amounts of PbO and $B_2O_3$ may also be added.

Figure 2:
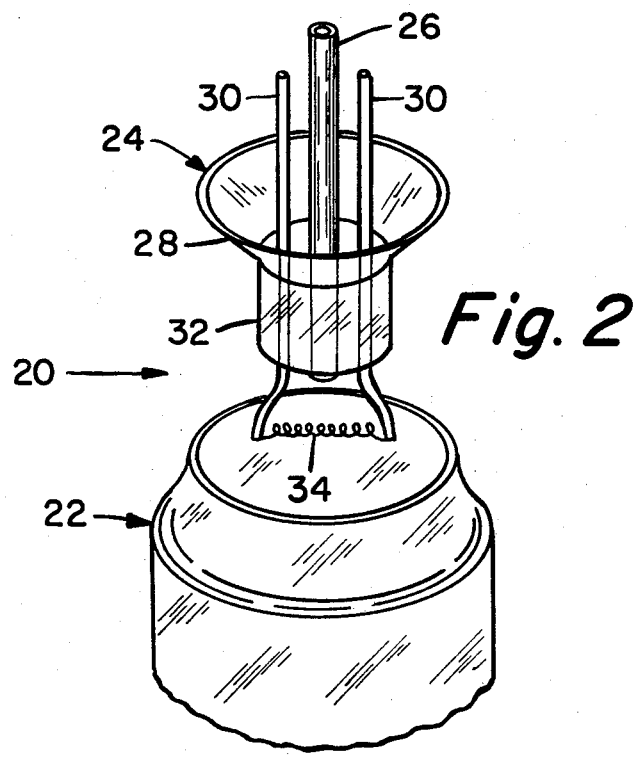
Figure 3:
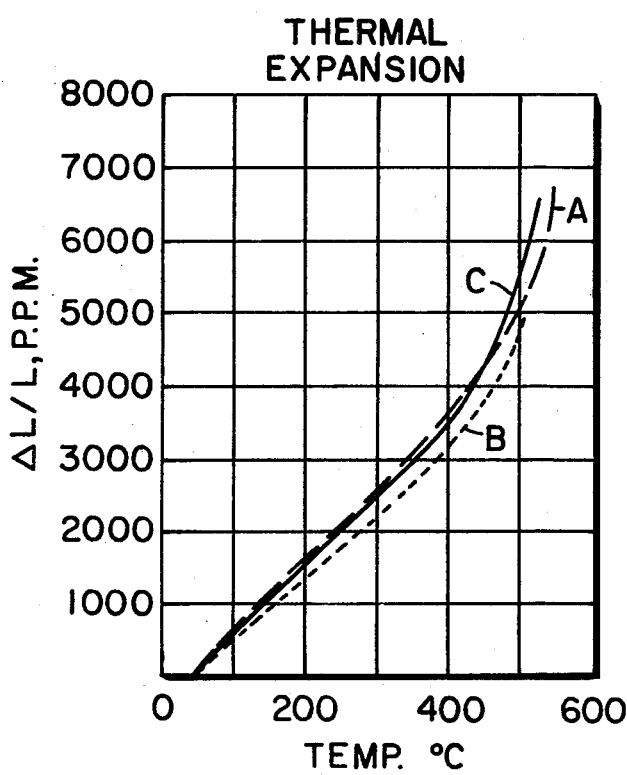

The invention is further described with reference to the accompanying drawing in which, FIG. 1 is a side view of a typical small electrical lamp illustrating one embodiment of the invention, FIG. 2 is an exploded view of a portion of a typical fluorescent lamp illustrating another embodiment of the invention, and FIG. 3 is a graphical illustration of the thermal expansion characteristics of a specific glass-glass-metal combination for use in the embodiment of FIG. 2.

FIG. 1 shows photoflash lamp 10 having dumet electrical conductors 12 sealed within a pinch type seal 14. Conductors 12 serve to conduct current through the glass enclosure to coil filament 18 within the lamp. Structurally, the glass enclosure consists of envelope portion 16 and pinch seal 14, but is composed of a single glass in accordance with this embodiment of the invention.

FIG. 2 depicts components of a typical fluorescent lamp 20 and their interrelationship. Lamp 20 includes glass envelope 22, adapted to have a phosphor coating applied to its inner surface, and a mount assembly generally designated 24. The latter is composed of exhaust tube 26, flare 28 sealed to electrical current conductors 30 and tube 26 with a press seal 32, and coil 34. Exhaust tube 26 serves to exhaust the envelope interior during lamp construction.

Envelope 22 is a tubular glass member produced from an electrical soda lime glass such as described in U.S. Pat. No. 1,369,988 issued March 1, 1921 to E. C. Sullivan and W. C. Taylor. The glass may for example be composed of 73 % $SiO_2$, 17% $Na_2O$, 5% CaO, 3.5% MgO, 1% $Al_2O_3$ and 0.5% $K_2O$, the composition being in percent by weight on an oxide basis.

Current conductors 30 are lengths of a dumet type wire consisting of a core portion produced from a 42 percent nickel-iron alloy and having a copper coating as defined in ASTM Designation F29–68. The coefficient of thermal expansion of lime glass envelope 22 is sufficiently closely matched to the effective expansion of the dumet wire so that conductors 30 could be directly sealed to the envelope. However, the log of the electrical resistivity of the lime glass at 250°C. is approximately 8.0. This value is too small to permit adequate insulation of conductors 30 from one another in press seal 32. Accordingly, an intermediate glass is employed to provide an adequately high electrical resistivity to prevent current leakage between conductors 30 during lamp operation.

In accordance with the present invention, lamp components, such as exhaust tube 26, flare 28, envelope 16 and seals 14 and 32, are produced from an electrical sealing glass having a composition selected within ranges as defined in the following table. In this table, the initial column sets forth the glass component oxides; the second column sets forth the general ranges within which these component oxides may be selected; the third column sets forth preferred ranges for glasses free of lead oxide (PbO); the fourth column sets forth preferred ranges for glasses containing a small, limited amount of lead oxide (PbO).

TABLE I

| | | | |
|---|---|---|---|
| $SiO_2$ | 63–71 | 64–71 | 63–68 |
| $Al_2O_3$ | 1.5–4.0 | 1.5–4.0 | 1.5–4.0 |
| $B_2O_3$ | 0–1.5 | 0–1.5 | 0–1.5 |
| $Al_2O_3 + B_2O_3$ | 1.5–4.0 | 1.5–4.0 | 1.5–4.0 |
| $K_2O$ | 9–12 | 9–12 | 9–12 |
| $Na_2O$ | 1.5–3.5 | 1.5–3.5 | 1.5–3.5 |
| $Li_2O$ | 1.5–3.0 | 1.5–3.0 | 1.5–3.0 |
| $K_2O + Na_2O + Li_2O$ | 14–18 | 15–18 | 14–17 |
| BaO | 7–17 | 12–17 | 7–17 |
| PbO | 0–8 | ---- | 0–8 |
| BaO + PbO | 12–19 | 12–17 | 12–19 |

Silica is the primary glass forming oxide in the present glasses. As described hereafter, other oxides are incorporated in the glasses at the expense of, and to modify the characteristics imparted by, the silica. A particular feature of the present glasses is a relatively high silica content while still achieving desired physical characteristics such as resistivity and viscosity-temperature relationship.

Barium oxide (BaO) imparts high electrical resistivity to the glasses defined in TABLE I, thus serving as a substitute in this respect for the lead oxide (PbO) employed in prior electrical sealing glasses. In these compositions, at least 7 percent by weight BaO is required for this purpose and the minimum content is 12 percent if the glass is completely free of PbO. Both the liquidus temperature and the devitrification rate of the glass increase rapidly with increase in BaO content. Accordingly, this content should not exceed 17 percent by weight in any event.

As indicated earlier, it is highly desirable to completely avoid the presence of lead oxide for various reasons. However, the presence of a small amount does have a strong effect in slowing down the rate of crystal growth in certain glasses. Consequently, in some instances, it may be tolerated in an amount not exceeding 8 percent by weight for this purpose. However, it should be avoided if possible and the total BaO + PbO must be limited to less than 19 percent by weight.

Other divalent metal oxides generally provide no particular advantage in the present glasses and have an adverse effect on at least some of the desired characteristics. In particular, relative to BaO, they tend to increase the viscosity of the glass at low temperatures, and to lower the electrical resistivity. Therefore such oxides should generally be avoided, except as impurities or in minor amounts for specific property adjustments.

The strong fluxing power of alkali metal oxides, particularly soda and lithia, in glass melting is well known. Likewise, it is well known that a substantial content of an alkali metal oxide generally causes a sharp increase in the expansion coefficient of a glass, and a sharp decrease in the electrical resistivity. It is a feature of the present glasses that the alkali metal oxides are used in a specified combination to achieve required properties, especially required electrical resistivity and thermal expansion properties.

In particular, substantial amounts of potassium oxide ($K_2O$) and lithium oxide ($Li_2O$), each within its indicated ranges, are employed in combination to maintain both high electrical resistivity and a proper expansion for sealing purposes. Optimum resistivity values are obtained when the ratio of $K_2O/Li_2O$, on a mole basis, is maintained within the range of 2:1 to 1.4:1. Sodium oxide ($Na_2O$) has the normal effect of increasing the glass expansion and lowering the electrical resistivity. Therefore, the soda content of the glasses is minimized, but a small amount of this oxide is necessary to maintain the strain point sufficiently low and provide suitable glassworking characteristics.

Both alumina ($Al_2O_3$) and boric oxide ($B_2O_3$) serve to suppress the liquidus temperature of the glass and thereby limit devitrification tendencies during glass forming and working. $Al_2O_3$ is preferred because its presence in the glass composition permits the required $Li_2O$ content to be added to the glass batch in a relatively inexpensive mineral form such as spodumene. The total content of $Al_2O_3$ or $B_2O_3$ must not exceed 4.0 percent because of the marked effect that these oxides have in decreasing the expansion of the glass and raising the strain point.

It is common practice to incorporate at least a small amount of one or more fluorides in a glass batch to facilitate melting and to soften the glass. However, this practice must be avoided in the present glasses because of the tendency of fluorides to volatilize and interfere with both lampworking and lamp service. In general other glassmaking constituents are avoided, except in minute amounts having no substantial effect on the glass characteristics. For example, customary amounts of a glass fining agent, e.g., arsenic or antimony oxide, and a glass coloring agent, if desired, are contemplated.

By way of further illustrating suitable glasses for the present invention, several exemplary compositions are set forth in the following table on the oxide basis in percent by weight as calculated from the glass batch. The table further sets forth electrical and physical properties for these glasses, including the strain point (S.P.), the logarithm of electrical resistivity (Log. R) as measured at 250°C., and the liquidus temperature of the glass.

TABLE II

|  | 1 | 2 | 3 | 4 | 5 | 6 | 7 |
|---|---|---|---|---|---|---|---|
| $SiO_2$ | 66.3 | 66.3 | 65.3 | 65.3 | 67.6 | 64.3 | 67.2 |
| $Al_2O_3$ | 1.8 | 3.4 | 3.5 | 3.5 | 3.5 | 2.6 | 2.6 |
| $B_2O_3$ | 1.2 |  |  |  | 1.2 |  | 1.2 |
| $Li_2O$ | 2.3 | 1.5 | 2.2 | 2.3 | 2.1 | 2.0 | 2.3 |
| $Na_2O$ | 2.7 | 1.6 | 2.3 | 2.6 | 2.2 | 3.2 | 2.2 |
| $K_2O$ | 9.8 | 11.8 | 11.3 | 9.6 | 11.4 | 9.6 | 10.7 |
| BaO | 15.9 | 15.4 | 7.8 | 13.0 | 13.3 | 13.0 | 13.4 |
| PbO |  |  | 7.6 | 3.8 |  | 3.8 |  |
| S.P. °C. | 441 | 453 | 421 | 425 | 445 | 431 | 445 |
| Exp. (0-300 °C.) $\times 10^7$ | 90.7 | 89.0 | 89.7 | 91.2 | 92.0 | 90.5 | 88.6 |
| Log. R (250°C.) Internal | 10.3 | 10.1 | 10.0 | 10.0 | 10.0 | 10.2 | 10.2 |
| Liquidus (°C.) |  | 703 | 896 | 888 | 835 | 837 |  |

These glasses may be melted in conventional manner using ordinary glass batch ingredients such as sand, alkali metal and barium carbonates or nitrates, and/or lithium minerals such as spodumene. The lithium oxide content may be supplied by lithium carbonate if necessary, but, as indicated earlier, it is preferable to use a lithium aluminum silicate mineral such as spodumene as the batch material to provide both $Li_2O$ and $Al_2O_3$ as well as some silica. The glass batch may be melted in any conventional type unit, usually at a temperature in the range of 1,500°–1600°C.

While the glasses may be worked in any conventional manner, it is customary to draw electrical sealing glasses in the form of cane or tubing. In particular, the present glasses are designed for drawing on a Vello type tube drawing system and have liquidus temperatures below the temperature required for such glass drawing purposes. The tube drawing temperature is dependent on the size of tubing being drawn and is customarily stated in terms of viscosity. Thus, exhaust tubing may be drawn at a viscosity as low as $2 \times 10^4$ poises, whereas larger flare tubing may require a magnitude greater viscosity, that is a viscosity of $2 \times 10^5$ poises.

It is a primary consideration in sealing components such as glass members 16 and 28 and metal members 12 and 30, that the expansion characteristics of the various materials closely match one another. It has been common practice to compare materials, for sealing purposes, in terms of their coefficients of thermal expansion. This coefficient is an average expansion change per unit length per degree Centigrade over a selected temperature range, the range 0°–300°C. customarily being used to state the average expansion coefficient of a glass. In this scale, electrical sealing glasses such as Code 0120 have coefficients of about 90 ($90 \times 10^{-7}$ units /°C.), and the present glasses meet this criterion.

While the coefficient of expansion is a very useful indicator, a more significant measurement in a given seal is the mismatch (difference in expansion) at the lowest glass setting temperature. The setting temperature of a glass is arbitrarily defined as a temperature 5°C. above the strain point of the glass.

By way of illustrating both the expansion characteristics required for lamp and tube production, and the particular suitability of the glasses defined above for this purpose, reference is made to FIG. 3 of the accompanying drawing. In this figure, temperature is plotted in degrees Centigrade along the horizontal axis and expansion in units of length per unit length is plotted along the vertical axis.

The curves in the graph then are typical expansion curves with which one skilled in the glass-metal sealing art is completely familiar. Curve A is the expansion curve for the soda lime glass described earlier in the production of lamp envelopes such as envelope 22 in FIG. 2. Curve B is the radial expansion curve for the dumet wire defined in the ASTM Designation referred to above in the description of conductors 12 and 30. Curve C represents the expansion characteristics of a glass having the composition of Example 7 in TABLE II above and being particularly adapted to combination with the indicated lime glass and dumet wire in lamp tube production.

The significant temperature in the graphical illustration of FIG. 2 is 450°C., the setting point of glass 7. It will be observed that glass 7 and the soda lime glass are a very close match at this temperature. The optically measured stress at room temperature between dumet wire and these glasses, corresponds to a mismatch on the order of 100 parts per million at the setting temperature.

We claim:

1. An electrical article selected from the group consisting of electrical lamps and tubes comprising copper-coated, nickel iron alloy electrical current conductors, an element connected to said conductors selected from the group consisting of filaments and coils, and a glass enclosure consisting of an envelope and a stem portion through which said conductors pass to said element, at least said stem portion of said glass enclosure consisting of an electrical sealing glass having a logarithm of electrical resistivity of at least 10 at 250°C. and of at least 8 at 350°C. and a strain point above 400°C. which is sealed to said conductors, said sealing glass consisting essentially, in weight percent on the oxide basis, of 63–71% $SiO_2$, 1.5–4.0% $Al_2O_3$, 0–1.5% $B_2O_3$, the total $Al_2O_3 + B_2O_3$ being 1.5–4.0%, 1.5–3.0% $Li_2O$, 1.5–3.5% $Na_2O$, 9–12% $K_2O$, the total alkali metal oxide content being 14–18%, 7–17% BaO, and 0–8% PbO, the total BaO + PbO being 12–19%.

2. An electrical article in accordance with claim 1 wherein the glass enclosure consists entirely of said electrical sealing glass.

3. An electrical article in accordance with claim 1 wherein the glass enclosure consists of a soda-lime-silica type glass envelope and a stem portion composed of the electrical sealing glass, the latter being sealed intermediate the envelope and the electrical conductors.

4. An electrical article in accordance with claim 1 wherein the electrical sealing glass is free of lead oxide (PbO) and consists essentially of 64–71% $SiO_2$, 1.5–4.0% $Al_2O_3$, 0–1.5% $B_2O_3$, the total $Al_2O_3 + B_2O_3$ being 1.5–4.0%, 1.5–3.0% $Li_2O$, 1.5–3.5% $Na_2O$, 9–12% $K_2O$, the total alkali metal oxide content being 15–18 percent, and 12–17% BaO.

5. An electrical article in accordance with claim 1 wherein the electrical sealing glass consists essentially of 63–68% $SiO_2$, 1.5–4.0% $Al_2O_3$, 0–1.5% $B_2O_3$, the total $Al_2O_3 + B_2O_3$ being 1.5–4.0%, 1.5–3.0% $Li_2O$, 1.5–3.5% $Na_2O$, 9–12% $K_2O$, the total alkali metal oxide being 14–17%, 7–17% BaO, and up to 8% PbO, the total BaO + PbO being 12–19%.

* * * * *